US008046360B2

(12) United States Patent
Tiyyagura (10) Patent No.: US 8,046,360 B2
(45) Date of Patent: Oct. 25, 2011

(54) REDUCTION OF ANNOTATIONS TO EXTRACT STRUCTURED WEB DATA

(75) Inventor: Mahesh Tiyyagura, Hyderabad (IN)

(73) Assignee: Yahoo! Inc., Sunnyvale, CA (US)

( * ) Notice: Subject to any disclaimer, the term of this patent is extended or adjusted under 35 U.S.C. 154(b) by 917 days.

(21) Appl. No.: 11/956,130

(22) Filed: Dec. 13, 2007

(65) Prior Publication Data

US 2009/0157597 A1 Jun. 18, 2009

(51) Int. Cl.
*G06F 7/00* (2006.01)
(52) U.S. Cl. ......................... 707/737; 707/748; 715/231
(58) Field of Classification Search ........................ None
See application file for complete search history.

(56) References Cited

U.S. PATENT DOCUMENTS

2006/0112089 A1 5/2006 Broder et al.
2007/0150802 A1* 6/2007 Wan et al. ..................... 715/512

OTHER PUBLICATIONS

Bar-Yossef, Z., Broder, A., Kumar, R., Tomkins, A. (2004), "Sic transit gloria telae: towards an understanding of the web's decay", Proceedings of the 13th International Conference on World Wide Web (WWW), pp. 328-337.
Buttler, D., "A Short Survey of Document Structure Similarity Algorithms", Mar. 5, 2004, The 5th International Conference on Internet Computing, Las Vegas, NV, United States, Jun. 21, 2004 through Jun. 24, 200, 9 pages.
Broder et al., "Syntactic Clustering of the Web," SRC Technical Note, 1997-015, Jul. 25, 1997, 13 pages.
U.S. Appl. No. 11/955,129, filed Dec. 12, 2007.
Black, Paul E., "greedy algorithm", in Dictionary of Algorithms and Data Structures [online], Paul E. Black, ed., U.S. National Institute of Standards and Technology. Feb. 2, 2005. downloaded on Oct. 30, 2007, Available from: http://www.nist.gov/dads/HTML/greedyalgo.html.
Hochbaum et al., "A Best Possible Heuristic for the k-Center Problem", Mathematics of Operations Research, vol. 10, No. 2 (May 1985), pp. 180-184.
Kushmerick, Nicholas, "Wrapper induction:Efficiency and expressiveness", Artificial Intelligence 118 (2000) 15-68.
Kushmerick, Nicholas, "Wrapper induction:Efficiency and expressiveness", Workshop on AI and Information Integration, AAAI-98, 1998. http://citeseer.ist.psu.edu/article/kushmerick98wrapper.html, downloaded on Nov. 29, 2007, 8 pages.
Tenier et al., "Knowledge extraction from webpages", http://ftp.informatik.rwth-aachen.de/Publications/CEUR-WS/Vol-185/semAnnot05-11.pdf, downloaded on Oct. 29, 2007, 4 pages.

* cited by examiner

*Primary Examiner* — Belix M Ortiz
(74) *Attorney, Agent, or Firm* — Weaver Austin Villeneuve and Sampson LLP (57) ABSTRACT

Document, such as web pages of a domain, are annotated to facilitate extracting structured information from the documents. The documents are clustered. Each cluster is such that the documents within that cluster are similar to each other at least with respect to a first threshold, such as according to a shingling metric, where the first threshold is an 8/8 shingling match. There is at least one overlap cluster, each overlap cluster including at least one of the plurality of clusters such that documents of the at least one cluster included in that overlap cluster are similar to each other at least with respect to a second threshold that is lower than the first threshold. A particular overlap cluster is designated, as is a particular cluster of the particular overlap cluster. For the particular designated cluster, an obtained annotation is transferred to other clusters included in the designated particular overlap cluster.

24 Claims, 4 Drawing Sheets

REDUCTION OF ANNOTATIONS TO EXTRACT STRUCTURED WEB DATA

BACKGROUND

Much of the data available on the world wide web is served from a logically well-organized structured collection of data (such as a relational database). For example, a website to sell event tickets may maintain a table in a database with a schema such as: concert id, artist, price of ticket, availability of tickets, location, time, etc. Typically, though, there is a web page for each event and a master page with links to each event. As another example, a company website that publishes job openings may be maintaining the job data with a schema such as: job id, title, location, qualifications required, and job description. Typically, though, there is a separate web page for each job opening. There may be a master page that links to office locations, which in turn link to each job page.

SUMMARY

In accordance with an aspect, documents of a corpus are annotated to facilitate extracting structured information from the documents. For example, the documents may be web pages of a particular domain. A clustering of the documents, into a plurality of clusters, is determined. Each cluster is characterized in that the documents within that cluster are similar to each other at least with respect to a first threshold. For example, the documents may be clustered according to a shingling metric, where the first threshold is an 8/8 shingling match.

Further characterizing the clustering, there is at least one overlap cluster, each overlap cluster including at least one of the plurality of clusters such that documents of the at least one cluster included in that overlap cluster are similar to each other at least with respect to a second threshold that is lower than the first threshold. For example, the second threshold may be a 7/8 shingling match.

A particular overlap cluster may be clustered, as well as designating a particular cluster of the particular overlap cluster. For the particular designated cluster, an annotation is obtained for that designated particular cluster and the annotation is transferred to other clusters, if any, included in the designated particular overlap cluster.

This may be repeated plural times such that, for each repetition, the designated particular overlap cluster for that repetition is a cluster that remains after a previous repetition, after removing from consideration the particular overlap cluster designated in the previous repetition of step and the clusters of the particular overlap cluster designated in the previous repetition. The transfer of the annotation to other clusters may be recursively performed relative to relationships between clusters via an overlap cluster.

DETAILED DESCRIPTION

The inventors have realized the desirability of being able to observe web pages and extract the structure of data collectively represented by the web pages, and to, in the process of extracting the structure, minimize the amount of annotation utilized. Annotation is a process by which training data is manually provided for sample web pages, in a supervised manner, and an unsupervised process uses the training data to apply the structure to other web pages.

In one relatively simplistic method, structurally similar web pages are clustered together. For each cluster, a "wrapper" is learned for each cluster based on annotation of a few sample web pages for that cluster. The wrapper for each cluster is then applied, based on the sample web pages for that cluster, to all other web pages of that cluster.

As discussed above, it is desirable to minimize the amount of annotation involved in extracting the structure of data collectively represented by web ages. In accordance with one aspect, then, the structure is determining a clustering of the web pages into a plurality of clusters, such that each cluster is characterized in that the web pages within that cluster are similar to each other at least with respect to a first threshold.

The clustering includes determining at least one overlap cluster, each overlap cluster including at least one of the plurality of clusters such that web pages of the at least one cluster included in that overlap cluster are similar to each other at least with respect to a second threshold that is lower than the first threshold. (For example, the plurality of clusters may be 8/8 shingle clusters, whereas the overlap clusters may be 7/8 shingle clusters.)

A particular overlap cluster is designated, as well as designating a particular cluster of the particular overlap cluster. For the particular designated cluster of the particular overlap cluster, an annotation is obtained for that designated particular cluster. The obtained annotation is transferred to other clusters, if any, included in the designated particular overlap cluster (as well as, in some examples, to clusters in a same overlap cluster as one of the "other clusters," even if not the original designated particular overlap cluster. The annotating and transferring steps may be repeated for the various overlap clusters. By transferring annotations to other clusters of an overlap cluster, annotations may be minimized.

Figure 1:
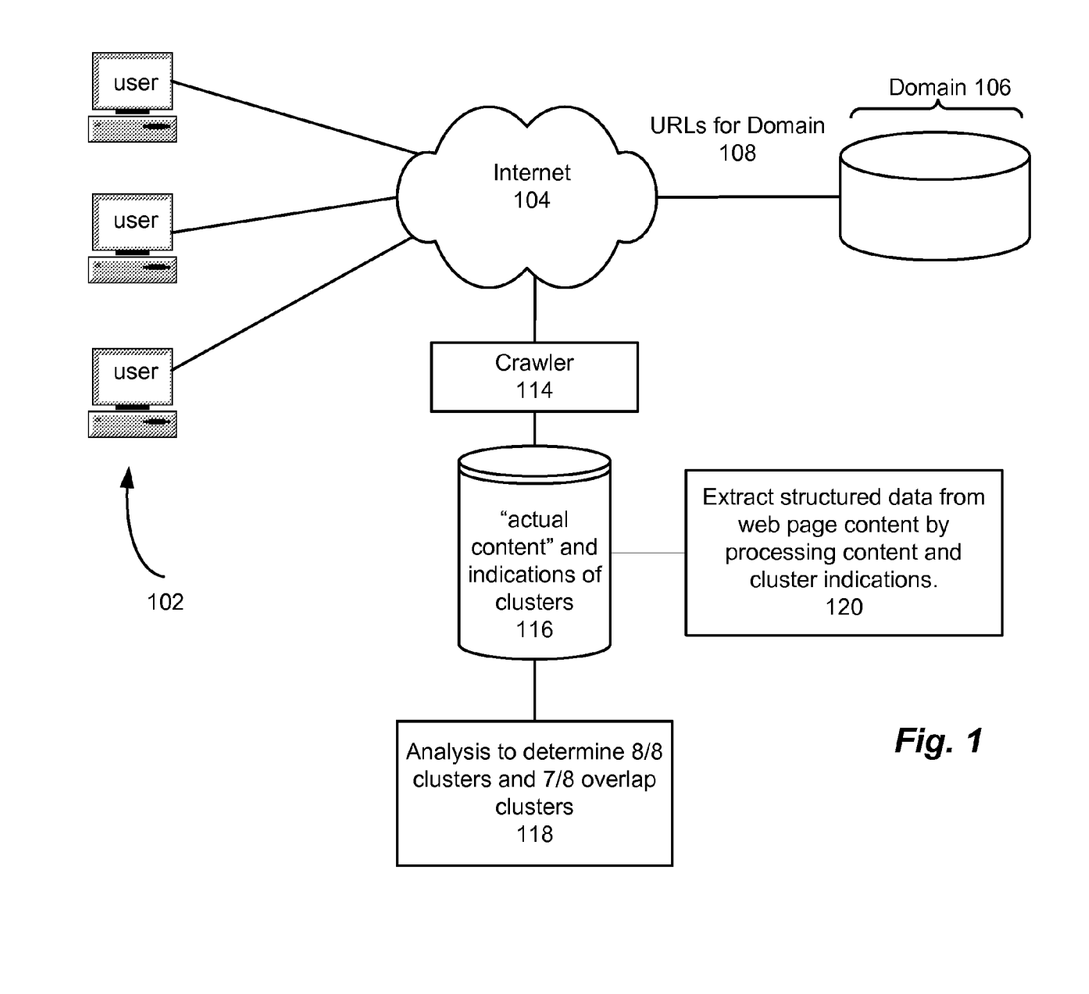
FIG. 1 schematically illustrates an environment in which web pages may be clustered and annotated using overlap clusters.

Before exploring an example method in detail of using the clustering to extract structured information on web pages, we first describe, with reference to FIG. 1, an architecture that broadly illustrates an environment in which such web pages may be clustered and annotated in accordance with an example of the invention. Referring to FIG. 1, a "domain" exists on the world wide web, such that when access requests having a domain identification in the universal resource locator (URL) match to that domain, the access requests are directed to one or more web servers associated with that domain. In general, the world wide web is made up of numerous such domains.

In the FIG. 1 example, the domain 106 is accessible via a network 104 (such as the internet) by users 102. For example, access requests 108 may be URLs generated by browser programs executed by computing devices with which the users 102 are interacting. For example, the domain may correspond to "cnn.com" and the users 102 may be interacting with the web browser programs to cause access requests 108 to be generated.

The FIG. 1 environment further includes a web crawler 114 that is configured to browse the web automatically, generating web access requests and receiving corresponding web page content. Web crawlers are known to be used, for example, by search engines to visit numerous web pages. The received web page content is saved in storage 116 for processing, such as generating an index usable by a search engine in responding to search queries.

An analysis process 118 processes the received web page content saved in storage 116. The analysis process 118 includes processing to cluster web pages based on characteristics of the web page content. In one example, the clustering of the analysis process 118 is generally for web pages that result from access requests corresponding to a particular domain. Having clustered web pages together, the analysis process 118 further includes processing to acquire, in a supervised manner, training data manually provided for sample web pages (annotation). The analysis processing 118 further includes an unsupervised process that uses the training data to apply the structure to other web pages to learn the structure of the web pages (using the annotations) so that the structured information present on the web pages of the domain can be extracted.

Clustering of web pages is known. For example, the paper entitled "Syntactic Clustering of the Web," by Broder et al., describes clustering using shingling. The paper entitled "A Short Survey of Structure Similarity Algorithms," by D. Buttler, describes a number of known clustering algorithms. Using a shingling technique, in particular, web pages whose measure of structural similarity is above a particular threshold may be clustered together.

In accordance with an example, only the HTML tag sequence of the web pages is considered in determining structural similarity among the web pages. A contiguous subsequence contained in a document D is called a shingle. Given a document D, its w-shingling S(D, w) is defined as the set of all unique shingles of size w contained in D.

Continuing with the example, the shingling steps may include computing a sequence of hash values using a moving window of size w. This is done for S orthogonal hash functions (i.e., hash functions that are independent of each other, such that the output of one hash function gives no information about the output of another has function.) The minimum shingles from each hash function are used to form a structural fingerprint for each web page. The number of common minimum shingles between two web pages is an indication of the amount of structural similarity between the two web pages. In one example, w=10 and s=8 (i.e., each web page fingerprint has eight shingles).

As mentioned above, using a shingling technique, in particular, web pages whose similarity measure is above a particular first threshold (e.g., 8/8 shingles) may be clustered together. In accordance with an example of the clustering, though, 8/8 shingle clusters whose web pages have a similarity measure above a second threshold, lower than the first threshold (e.g., the second threshold may be 7/8 shingles), are themselves clustered together into overlap clusters.

Referring to the pseudocode below, we describe an example method by which to determine 8/8 shingle clusters of web pages and, in addition, to determine overlap clusters of web pages having 7/8 shingles in common. The example method assumes that it has already been determined all URL pairs <u1,u2> that have 7 shingles in common, that <u1,u2> and <u2,u1> have been emitted, and that the list has been sorted based on the first element in the pair.

```
while(more pairs){
    u1 <- first element in pair
    u2 <- second element in pair
    # seen, cluster are associative arrays
    if (u1 in seen){
        if(u1 in cluster){
            Add u2 to cluster[u1];
            seen[u2]=1;
        }
    }
    else{
        seen[u1]=1;
        seen[u2]=1;
        Add u1 and u2 to cluster[u1];
    }
}
```

Basically, example method illustrated in the above pseudocode operates to greedily choose a center and collect all URLs that have seven shingles in common with the center into one 7/8 shingle match cluster (overlap cluster). Since URLs repeat in the list, this process generates a one-to-many mapping between 7/8sh shingle match clusters and 8/8 shingle match clusters. In other words, an 8/8 shingle match cluster can have more than "parent" 7/8 shingle match cluster.

Figure 2:
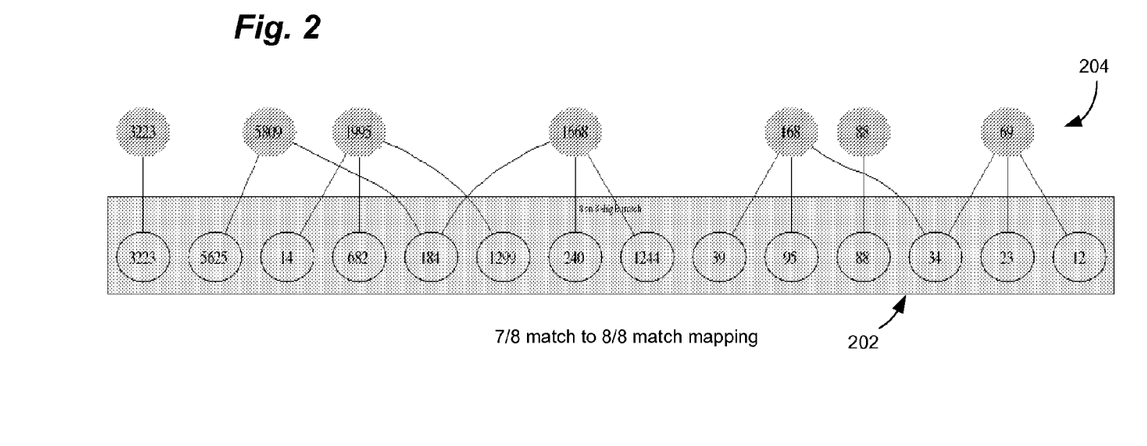
FIG. 2 illustrates an example result of generating a clustering mapping including clusters and overlap clusters.

Thus, for example, a cluster mapping like the mapping example shown in FIG. 2 may be determined. Turning to FIG. 2, this figure schematically illustrates an example result of generating a clustering mapping including clusters and overlap clusters, whether resulting from the example method illustrated by the pseudocode above, or from some other processing. In the FIG. 2 depiction, clusters of web pages that have eight shingles in common are represented in the box 202. Web pages, of the eight shingle clusters, that have seven shingles in common, are represented by the bubbles 204 above the box 202. In the example, the number inside each cluster bubble denotes the size (number of web pages/URLs) in that cluster.

Starting from the left in the box 202, FIG. 2 depicts that there are clusters of web pages having eight shingles in common, with the following number of URLs—3223; 5625; 14; 682; 184; 1299, etc. The bubbles 204 denote 7/8 shingle "overlap" clusters having, for example, 3223 URLs (with all URLs being in the first 8/8 shingle cluster as well); 5809 URLs (with the URLs being a combination of the URLs in the 8/8 shingle cluster having 5625 URLs and the 8/8 shingle cluster having 184 URLs); 1995 URLs (with the URLs being a combination of the URLs in the 8/8 shingle cluster having 14 URLs, the 8/8 shingle cluster having 682 URLs, and the 8/8 shingle cluster having 1299 URLs).

In the FIG. 2 example, the overlap clusters are not mutually exclusive, in that some 8/8 shingle clusters are "members" of more than one overlap cluster 204. For example, the 8/8 shingle cluster having 184 URLs is shown in FIG. 2 as being a member of the overlap cluster 204 having 5809 URLs as well as being a member of the overlap cluster 204 having 1668 URLs. That is, web pages of the cluster having 184 web pages are in the overlap cluster having 5809 URLs as well as in the overlap cluster having 1668 URLs.

Having determined a clustering mapping such as the mapping shown in FIG. 2, we now discuss a method to choose one or more of the 8/8 shingle match clusters to be annotated. An annotation is a representation of nodes that are important in a domain. By associating a fingerprint with these nodes, the node fingerprints can be used to search and extract data form other pages in the domain tree. For example, the annotation may be transferred to other 8/8 shingle match clusters, related via an overlap cluster. Referring to the psuedocode below:

```
DupClusters <- All the 8/8 match clusters (e.g., clusters in the box 202 of
FIG. 1)
while(DupClusters){
    C_i = FindBestCluster( ) ;
    A_i = Get_Annotation(C_i);
    while(C_j = BreadthFirstTraversal(C_i)){
        If(A_i applies on C_j)
            Remove C_j from DupClusters;
        else
            continue;
    }
}
```

It is noted that breadth first traversal is a common graph traversal algorithm to traverse all nodes in a graph breadth-first search (BFS) is a graph search algorithm in which searching is begun at the root node of the graph. All the neighboring nodes are explored and, then, for each of those nearest nodes, the unexplored neighboring nodes are explored. This process is carried out recursively until all the relevant nodes are explored. Here, the clusters are the nodes.

For a particular 8/8 shingle match cluster (resulting from the FindBestCluster( )) function call, discussed below), an annotation is obtained for that 8/8 shingle match cluster and the annotation is transferred to other 8/8 match clusters, including 8/8 match clusters that are related by a 7/8 shingle match cluster to an 8/8 shingle match cluster that is already annotated. It should be noted that the annotation transfer may be recursive, meaning that a cluster receiving an annotation need not necessarily be directly related to (i.e., be a member of the same overlap cluster) an initial cluster that received an annotation. That is, the annotation may have been transferred through a chain of directly related clusters where, at each link in the chain, there is a direct relation back to a previous cluster via an overlap cluster.

Pseudocode for the FindBestCluster( ) routine is provided below:

```
FindBestCluster( ){
    From all 7/8 match clusters,
        choose B_i where i = argmax
            ((Sum of Sizes of 8/8 match clusters + MaxSize)/Nr of Clusters);
        return Cluster of MaxSize among its 8/8 match children
}
```

The argmax condition in the FindBestCluster( ) routine results in choosing a 7/8 shingle match cluster that has highest average count of URLs among the children 7/8 shingle match clusters and prefers the one with a large child (where "large" means includes a large number of URLs).

As discussed above, an annotation is a representation of "significant" nodes of a domain, and the node fingerprints can be used to extract data from other web pages in a domain tree having the same or similar fingerprint, using the same annotation. In one example, to compute the fingerprints, processing represented by the following pseudocode may be carried out on a URL that is representative for the node, which essentially hashes the path from the root of the domain along with attribute names

```
Invoke computeFingerPrints(document.root,0) to compute fingerPrints
computeFingerPrints(node,fingerPrintOfParent)
{
    myFingerPrint = fingerPrintOfParent+hash(node.attributeNames);
    var childs = node.childNodes;
    for(var i=0;i<childs.length;i++)
    {    if(childs[i].nodeType==1)
            computeFingerPrint(childs[i] , myFingerPrint);
        }
}
```

In other examples, a technique may be used such as is described in Wrapper Induction: Efficiency and Expressiveness (Workshop on AI and Information Integration, AAAI-98), by Nicholas Kushmerick. The Kushmerick paper is incorporated by reference in its entirety. Wrapper induction includes learning a wrapper (regular expression) from the training data (annotations) and applying this wrapper to other pages to extract the useful data.

Figure 3:
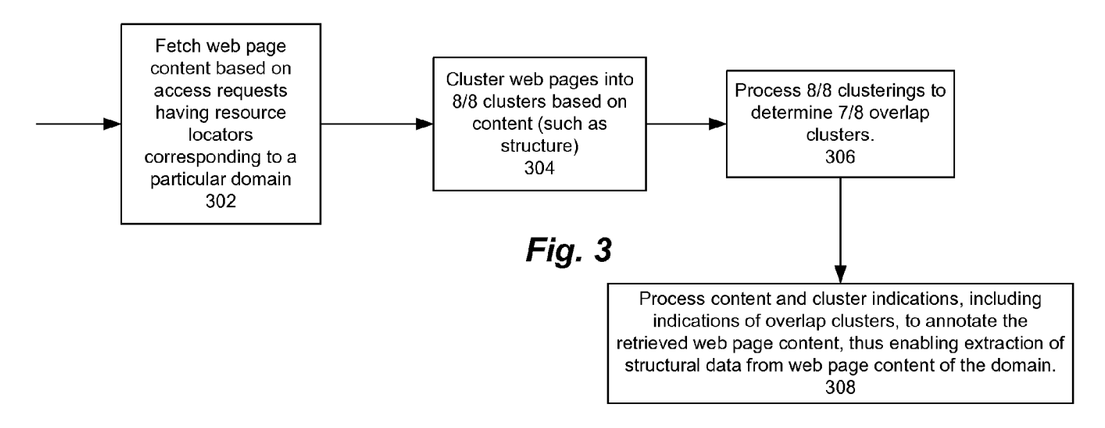
FIG. 3 is a flowchart illustrating a method of generating and employing a cluster mapping to extract structured data from web pages.

We now turn to FIG. 3, which is a flowchart illustrating a method of generating and employing a cluster mapping to extract structured data from web pages. At 302, web page content is fetched based on access requests having resource locators corresponding to a particular domain. For example, the web content may be fetched by a web crawler such as the web crawler 114 in the FIG. 1 illustration. At 304, the web pages are clustered based on a content similarity measure being at least at a first threshold. For example, the web pages may be clustered based on an 8/8 shingle match between the HTML structure of the web pages. (In this example, the "8/8 shingle match" is the first threshold.)

At step 306, the clusters are processed to determine overlap clusters based on a content similarity measure for web pages of the processed clusters being at least a second threshold, where the second threshold is lower than the first threshold. For example, web pages of 8/8 shingle match clusters may be clustered based on a 7/8 shingle match between the HTLM structure of the web pages. In some examples, at least some web pages are not restricted from being members of more than one overlap cluster.

Figure 4:
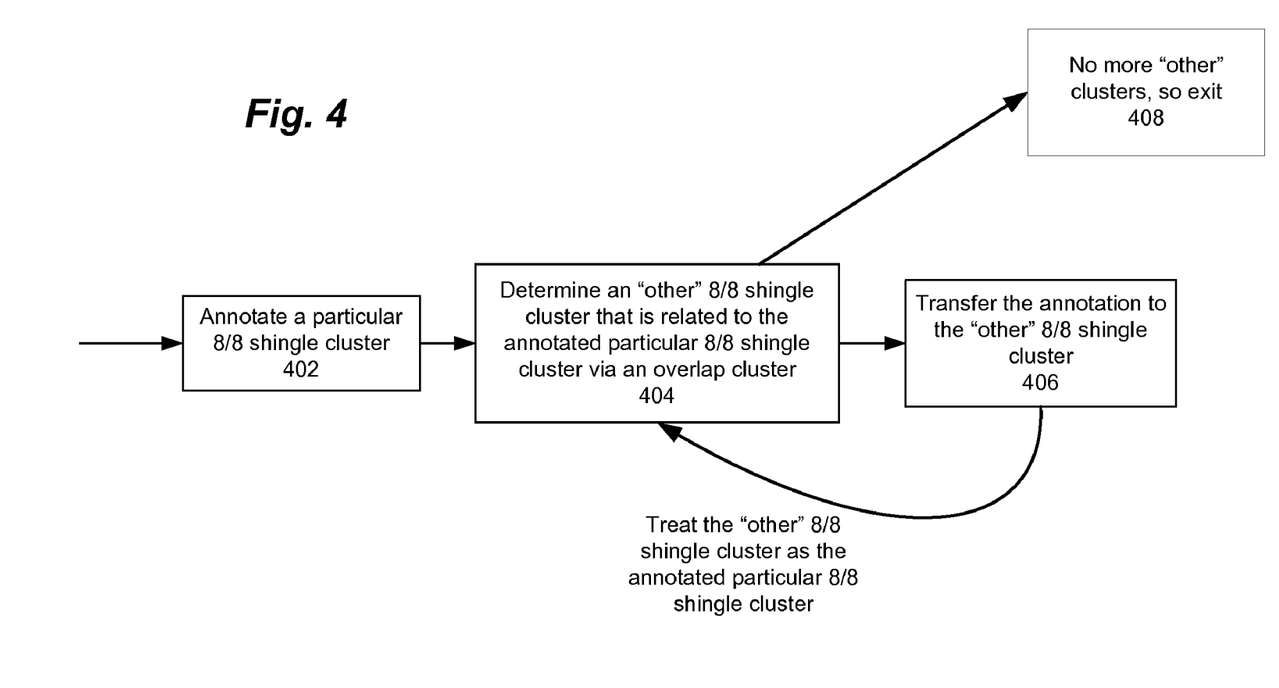
FIG. 4 is a flowchart illustrating, in greater detail, the step in the FIG. 3 flowchart of processing content and cluster indications.

At 308, the web page content and cluster indications (including indications of overlap clusters) are processed to annotate the retrieved web pages of the domain, such that the structured data may be extracted from the web pages. FIG. 4 is a flowchart illustrating an example implementation of step 308.

At 402, a particular 8/8 shingle cluster is annotated. This may be, for example, an 8/8 shingle determined using processing such as the FindBestCluster( ) function. At 404, an other 8/shingle cluster is determined that is related to the particular 8/8 shingle cluster via an overlap cluster. At 406, the annotation of the particular cluster is transferred to the determined other cluster unless, at 408, there is no other cluster. The processing of 404 and 406 are repeated, treating the other cluster as the particular cluster, until there are no other related other clusters.

Figure 5:
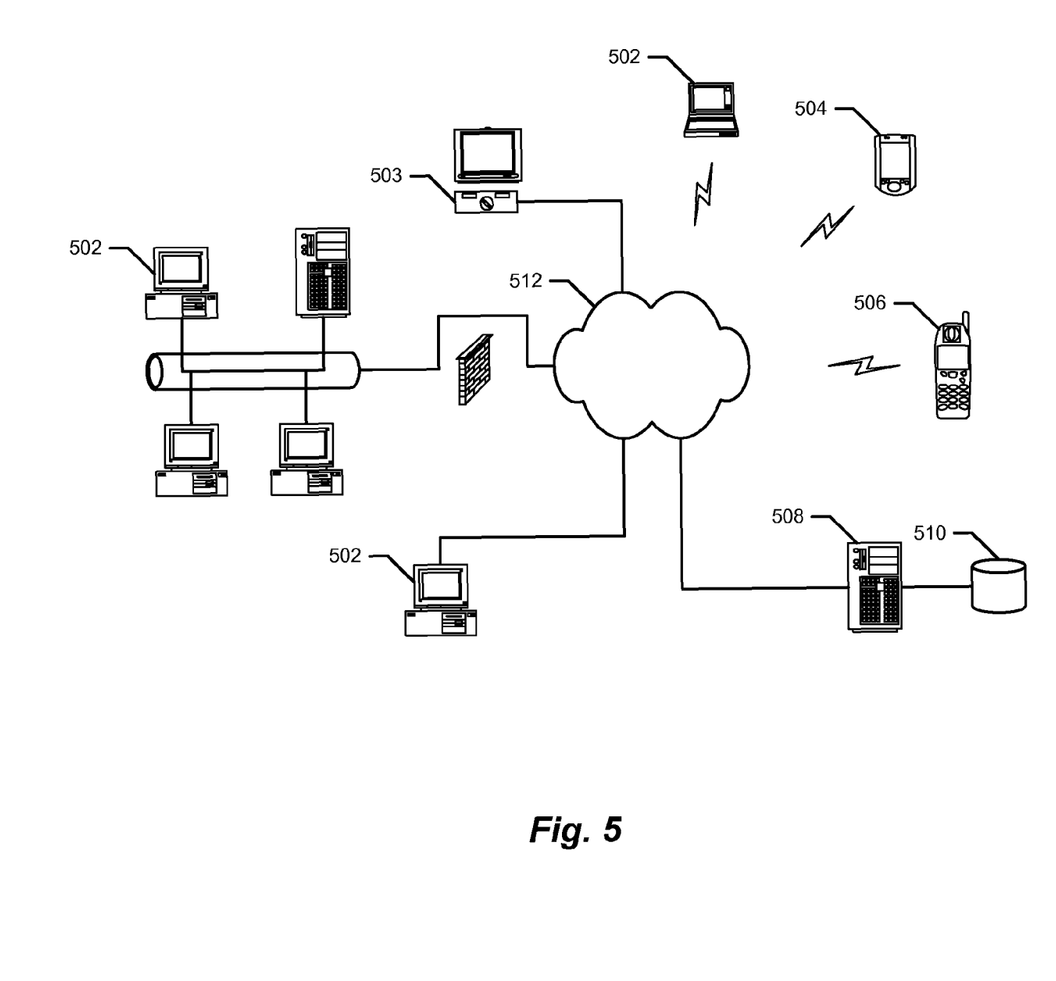
FIG. 5 is a simplified diagram of a network environment in which specific embodiments of the present invention may be implemented.

Embodiments of the present invention may be employed to facilitate extraction of structured data in any of a wide variety of computing contexts. For example, as illustrated in FIG. 5, implementations are contemplated in which users may interact with a diverse network environment via any type of computer (e.g., desktop, laptop, tablet, etc.) 502, media computing platforms 503 (e.g., cable and satellite set top boxes and digital video recorders), handheld computing devices (e.g., PDAs) 504, cell phones 506, or any other type of computing or communication platform.

According to various embodiments, applications may be executed locally, remotely or a combination of both. The remote aspect is illustrated in FIG. 5 by server 508 and data store 510 which, as will be understood, may correspond to multiple distributed devices and data stores.

The various aspects of the invention may also be practiced in a wide variety of network environments (represented by network 512) including, for example, TCP/IP-based networks, telecommunications networks, wireless networks, etc. In addition, the computer program instructions with which embodiments of the invention are implemented may be stored in any type of computer-readable media, and may be executed according to a variety of computing models including, for example, on a stand-alone computing device, or according to a distributed computing model in which various of the functionalities described herein may be effected or employed at different locations.

It is further noted that, while the discussion have been in terms of web pages of a domain, the corpus on which information may be annotated and extracted may be any corpus in which the information is presented in a document using the same structure. Furthermore, the structural similarity that is exploited need not be HTML structural similarity. Thus, for example, structural similarity between a pair of documents such as "first line is five words long" or "there is word 'ZIP' on fourth line. Furthermore, various notions of annotations may be employed, and the FindBestCluster( ) function may be application dependent.

In evaluating the efficacy of a method such as that described above, two metrics may be considered:

Recall: Are pages that are structurally similar in the same cluster?

Precision: Are pages in the same cluster structurally similar?

Thus, for example, the recall metric may be significant in that it is inversely proportional to cost (i.e., number of annotations used). Precision is directly proportional to the number of successful extractions (i.e., coverage/delivery). With respect to the described technique, in addition to having high recall, the number of annotations to extract information is reduced because other candidate clusters to which the annotation may be transferred are intelligently chosen.

What is claimed is:

1. A method of annotating documents of a corpus to facilitate extracting structured information from the corpus, comprising:
   determining a clustering of the documents into a plurality of similar characteristics clusters, such that
      each similar characteristics cluster is characterized in that the documents within that cluster have a similarity measure above a first similarity threshold, and
      there are one or more overlap clusters, each overlap cluster including one or more similar characteristics clusters such that all documents of the one or more similar characteristics clusters included in that overlap cluster have a similarity measure above a second similarity threshold, the second similarity threshold being lower than the first similarity threshold;
   designating a particular overlap cluster of the one or more overlap clusters;
   designating a particular similar characteristics cluster of the designated particular overlap cluster;
   obtaining an annotation for that designated similar characteristics cluster, wherein the annotation is a representation of important nodes of the documents in the designated similar characteristics cluster; and
   transferring the annotation to one or more other similar characteristics clusters, if any, included in the designated particular overlap cluster for use with the documents in the one or more other similar characteristics clusters.

2. The method of claim 1, further comprising:
   designating a second particular overlap cluster, different from the first particular overlap cluster, such that at least one of the other similar characteristics clusters is included in the designated second particular overlap cluster; and
   transferring the annotation to the designated second particular overlap cluster.

3. The method of claim 2, further comprising:
   designating a third particular overlap cluster, different from the first particular overlap cluster and the second particular overlap cluster, wherein the third particular overlap cluster includes a similar characteristics cluster for which an annotation has not been obtained or to which an annotation has not been transferred;
   designating a particular similar characteristics cluster of the third particular overlap cluster;
   for the designated particular similar characteristics cluster of the third particular overlap cluster, obtaining an annotation for that designated particular similar characteristics cluster of the third particular overlap cluster; and
   transferring the obtained annotation to other clusters, if any, included in the third designated particular overlap cluster.

4. The method of claim 1, wherein:
   designating the particular overlap cluster includes identifying an overlap cluster that has, among the overlap clusters, a highest average count of documents and designating that overlap cluster as the particular overlap cluster.

5. The method of claim 4, wherein:
   designating the particular similar characteristics cluster includes designating a similar characteristics cluster of the designated particular overlap cluster having a highest number of documents out of all the similar characteristics clusters of the designated particular overlap cluster.

6. The method of claim 1, wherein:
   determining a clustering of the documents into a plurality of similar characteristics clusters includes determining the clustering of the documents based on shingle similarity of the documents.

7. The method of claim 6, wherein:
   the first similarity threshold is all the shingles are the same and the second similarity threshold is less than all the shingles are the same.

8. The method of claim 1, wherein:
   the corpus is a web domain and the documents are web pages of the domain.

9. The method of claim 8, wherein:
   similarity is determined based on HTML structure within the web pages.

10. A computer program product for annotating documents of a corpus to facilitate extracting structured information from the corpus, the computer program product comprising at least one computer-readable medium having computer program instructions stored therein which are operable to cause at least one computing device to:
    determine a clustering of the documents into a plurality of similar characteristics clusters, such that each similar characteristics cluster is characterized in
that the documents within that cluster have a similarity measure above a first similarity threshold, and
there are one or more overlap clusters, each overlap cluster including one or more similar characteristics clusters such that all documents of the one or more similar characteristics clusters included in that overlap cluster have a similarity measure above a second similarity threshold, the second similarity threshold being lower than the first similarity threshold;
designate a particular overlap cluster of the one or more overlap clusters;
designate a particular similar characteristics cluster of the designated particular overlap cluster;
obtain an annotation for that designated similar characteristics cluster, wherein the annotation is a representation of important nodes of the documents in the designated similar characteristics cluster; and
transfer the annotation to one or more other similar characteristics clusters, if any, included in the designated particular overlap cluster for use with the documents in the one or more other similar characteristics clusters.

11. The computer program product of claim 10, wherein the computer program instructions are further operable to cause the at least one computing device to:
designate a second particular overlap cluster, different from the first particular overlap cluster, such that at least one of the other similar characteristics clusters is included in the designated second particular overlap cluster; and
transfer the annotation to the designated second particular overlap cluster.

12. The computer program product of claim 11, wherein the computer program instructions are further operable to cause the at least one computing device to:
designate a third particular overlap cluster, different from the first particular overlap cluster and the second particular overlap cluster, wherein the third particular overlap cluster includes a similar characteristics cluster for which an annotation has not been obtained or to which an annotation has not been transferred;
designate a particular similar characteristics cluster of the third particular overlap cluster;
for the designated particular similar characteristics cluster of the third particular overlap cluster, obtain an annotation for that designated particular similar characteristics cluster of the third particular overlap cluster; and
transfer the obtained annotation to other clusters, if any, included in the third designated particular overlap cluster.

13. The computer program product of claim 10, wherein:
designating the particular overlap cluster includes identifying an overlap cluster that has, among the overlap clusters, a highest average count of documents and designating that overlap cluster as the particular overlap cluster.

14. The computer program product of claim 13, wherein:
designating the particular similar characteristics cluster includes designating a similar characteristics cluster of the designated particular overlap cluster having a highest number of documents out of all the similar characteristics clusters of the designated particular overlap cluster.

15. The computer program product of claim 10, wherein:
determining a clustering of the documents into a plurality of similar characteristics clusters includes determining the clustering of the documents based on shingle similarity of the documents.

16. The computer program product of claim 15, wherein:
the first similarity threshold is all the shingles are the same and the second similarity threshold is less than all the shingles are the same.

17. The computer program product of claim 10, wherein:
the corpus is a web domain and the documents are web pages of the domain.

18. The computer program product of claim 17, wherein:
similarity is determined based on HTML structure within the web pages.

19. A computing system including at least one computing device, configured to annotate documents of a corpus to facilitate extracting structured information from the corpus, the at least one computing device configured to:
determine a clustering of the documents into a plurality of similar characteristics clusters, such that
each similar characteristics cluster is characterized in that the documents within that cluster have a similarity measure above a first similarity threshold, and
there are one or more overlap clusters, each overlap cluster including one or more similar characteristics clusters such that all documents of the one or more similar characteristics clusters included in that overlap cluster have a similarity measure above a second similarity threshold, the second similarity threshold being lower than the first similarity threshold;
designate a particular overlap cluster of the one or more overlap clusters;
designate a particular similar characteristics cluster of the designated particular overlap cluster;
obtain an annotation for that designated similar characteristics cluster, wherein the annotation is a representation of important nodes of the documents in the designated similar characteristics cluster; and
transfer the annotation to one or more other similar characteristics clusters, if any, included in the designated particular overlap cluster for use with the documents in the one or more other similar characteristics clusters.

20. The computing system of claim 19, wherein the at least one computing device is further configured to:
designate a second particular overlap cluster, different from the first particular overlap cluster, such that at least one of the other similar characteristics clusters is included in the designated second particular overlap cluster; and
transfer the annotation to the designated second particular overlap cluster.

21. The computer program product of claim 20, wherein the at least one computing device is further configured to:
designate a third particular overlap cluster, different from the first particular overlap cluster and the second particular overlap cluster, wherein the third particular overlap cluster includes a similar characteristics cluster for which an annotation has not been obtained or to which an annotation has not been transferred;
designate a particular similar characteristics cluster of the third particular overlap cluster;
for the designated particular similar characteristics cluster of the third particular overlap cluster, obtain an annotation for that designated particular similar characteristics cluster of the third particular overlap cluster; and transfer the obtained annotation to other clusters, if any, included in the third designated particular overlap cluster.

22. The computer program product of claim 19, wherein: designating the particular overlap cluster includes identifying an overlap cluster that has, among the overlap clusters, a highest average count of documents and designating that overlap cluster as the particular overlap cluster.

23. The computer program product of claim 22, wherein: designating the particular similar characteristics cluster includes designating a similar characteristics cluster of the designated particular overlap cluster having a highest number of documents out of all the similar characteristics clusters of the designated particular overlap cluster.

24. The computer program product of claim 19, wherein: determining a clustering of the documents into a plurality of similar characteristics clusters includes determining the clustering of the documents based on shingle similarity of the documents.

* * * * *